United States Patent
Schwarz

(10) Patent No.: US 11,381,310 B2
(45) Date of Patent: Jul. 5, 2022

(54) COMBINED COMMUNICATION AND RANGING FUNCTIONALITY ON A SPACECRAFT

(71) Applicant: MOMENTUS SPACE LLC, San Jose, CA (US)

(72) Inventor: Robert Erik Schwarz, San Jose, CA (US)

(73) Assignee: MOMENTUS SPACE LLC, San Jose, CA (US)

( * ) Notice: Subject to any disclaimer, the term of this patent is extended or adjusted under 35 U.S.C. 154(b) by 0 days.

(21) Appl. No.: 16/951,191

(22) Filed: Nov. 18, 2020

(65) Prior Publication Data
US 2022/0158729 A1    May 19, 2022

(51) Int. Cl.
| | |
|---|---|
| *H04B 10/118* | (2013.01) |
| *H04B 10/548* | (2013.01) |
| *H04B 10/524* | (2013.01) |
| *H04B 10/50* | (2013.01) |

(52) U.S. Cl.
CPC ......... *H04B 10/118* (2013.01); *H04B 10/503* (2013.01); *H04B 10/524* (2013.01); *H04B 10/548* (2013.01)

(58) Field of Classification Search
CPC .. H04B 10/118; H04B 10/503; H04B 10/548; H04B 10/524; H04B 10/40; H04B 10/116; H04B 10/27
USPC ........................................................ 398/125
See application file for complete search history.

(56) References Cited

U.S. PATENT DOCUMENTS

| | | | | |
|---|---|---|---|---|
| 5,877,721 | A * | 3/1999 | Tsang ...................... | G01S 7/292 342/36 |
| 5,926,297 | A * | 7/1999 | Ishikawa .................. | H04J 14/08 398/43 |
| 6,590,910 | B2 * | 7/2003 | Lin ........................ | H01S 3/1109 372/18 |
| 8,750,723 | B2 * | 6/2014 | Neilson .............. | H04B 10/5167 398/186 |
| 9,287,978 | B2 * | 3/2016 | Heine .................. | H04B 10/118 |
| 9,634,769 | B2 * | 4/2017 | Liaw .................... | H01S 3/06795 |
| 9,998,221 | B2 * | 6/2018 | Boroson .............. | H04B 10/118 |
| 10,177,848 | B1 * | 1/2019 | Ramer ................. | H04B 10/116 |

(Continued)

FOREIGN PATENT DOCUMENTS

| | | |
|---|---|---|
| CN | 108 254 915 A | 7/2018 |
| CN | 108 847 889 B | 9/2020 |

OTHER PUBLICATIONS

International Search Report and Written Opinion for Application No. PCT/US2021/059731, dated Mar. 11, 2022.

*Primary Examiner* — Abbas H Alagheband
(74) *Attorney, Agent, or Firm* — Marshall, Gerstein & Borun LLP

(57) ABSTRACT

An integrated communication and ranging system for use on a spacecraft includes: a laser module configured to emit at least one beam, a pointing module configured to direct the at least one beam toward a ground station and toward an object in space, and a detector module configured to detect a scattered portion of the at least one beam. The system further includes a control module configured to operate the pointing module to (i) transmit data to the ground station using the at least one beam and (ii) determine, using the detector module, a distance between the spacecraft and the object using the at least one beam.

15 Claims, 7 Drawing Sheets

(56) References Cited

U.S. PATENT DOCUMENTS

| | | | |
|---|---|---|---|
| 10,673,530 B2* | 6/2020 | LeGrange | H04B 10/118 |
| 10,707,961 B2* | 7/2020 | Turner | H04B 7/195 |
| 11,018,766 B2* | 5/2021 | Saathof | H04B 10/118 |
| 2012/0249775 A1 | 10/2012 | Paluszek et al. | |
| 2018/0196139 A1* | 7/2018 | Brown | G01S 17/10 |
| 2020/0021361 A1* | 1/2020 | Kingsbury | H04B 7/18513 |
| 2020/0209404 A1* | 7/2020 | Günther | G01S 19/02 |
| 2020/0404130 A1* | 12/2020 | Talbert | A61B 1/0638 |
| 2021/0278536 A1* | 9/2021 | Crouch | H04L 12/2801 |

* cited by examiner

COMBINED COMMUNICATION AND RANGING FUNCTIONALITY ON A SPACECRAFT

FIELD OF THE DISCLOSURE

The present disclosure generally relates to spacecraft communication and situational awareness and, more particularly, to a laser-based spacecraft communication system combining communication functionality with ranging functionality.

BACKGROUND

With increased commercial and government activity in Near Space, a variety of spacecraft and missions are under development. For example, a spacecraft may be dedicated to delivering payloads such as satellites from one orbit to another, clean up space debris, make deliveries to space stations, etc.

In many cases, a spacecraft requires instrumentation for spatial and situational awareness. The spacecraft may need for example to have information about its position with respect to nearby celestial bodies as well as objects around the spacecraft. Such situational awareness may be needed to successfully complete docking maneuvers and/or avoid collisions.

Further, a spacecraft also may need to be in communication with a ground station. For example, the spacecraft may need to be capable of receiving commands from the ground station (i.e., telecommands) and/or sending data (e.g., telemetry) to the ground station. To that end, the spacecraft may establish a radio-frequency link with a ground station using radio-frequency (RF) transceivers and antennas. Some of the challenges of the RF systems include limitations in bandwidth, large beam spread and corresponding path loss, as well as licensing and interoperability requirements.

In addition to operational requirements, spacecraft-based systems may need to satisfy weight and space requirements. That is, all of the systems may need to fit into specified mass and volume envelopes. Furthermore, proliferation of subsystems and components may increase the probability of failure.

SUMMARY

An example embodiment of the techniques of this disclosure is an integrated communication and ranging system for use on a spacecraft. The system includes a laser module configured to emit at least one beam, a pointing module configured to direct the at least one beam toward a ground station and toward an object in space, and a detector module configured to detect a scattered portion of the at least one beam. The system further includes a control module configured to operate the pointing module to (i) transmit data to the ground station using the at least one beam and (ii) determine, using the detector module, a distance between the spacecraft and the object using the at least one beam.

Another example embodiment of these techniques is a method for communicating and ranging in spacecraft. The method includes generating, using a laser module, at least one beam and directing the at least one beam toward a ground station using a shared optical path of a pointing module, to transmit data to the ground station. The method further comprises directing the at least one beam toward an object in space using the shared optical path of a pointing module and detecting a portion of the at least one beam scattered by the object using a detector module, to determine a distance between the spacecraft and the object.

DETAILED DESCRIPTION

Generally speaking, the disclosed spacecraft system combines situational awareness and communication capability using transmission and detection of optical signals in modulated laser beams. The situational awareness functionality of the system may include determining a distance to a space object in the vicinity (e.g., within a few kilometers) of the spacecraft. The communication functionality, on the other hand, may include establishing a high-bandwidth optical communication link with a ground station, which may be located on Earth, the Moon, or any other planetary or celestial body surface, or with another spacecraft. Furthermore, the combined system may advantageously reuse optical system components to accomplish situational awareness and communication functionality, thereby reducing mass and/or volume envelopes, cost, and probability of failure.

By implementing free-space optical communication techniques, such as using modulated laser beams, the system may offer certain advantages over radio-based communications. One such advantage is a larger bandwidth than radio communications. Another advantage is the ability to communicate without significant danger of interference with terrestrial and/or other space-based communication systems. Consequently, optical space-to-ground communication systems may operate without significant spectrum limitations. Yet another advantage of optical communication systems are lower power requirements for communications due to high directivity of laser beams.

To implement situation awareness and/or navigation capability, the system may function as a lidar system and optically detect and/or to determine distances to objects in the vicinity of the spacecraft. To that end, the system may emit one or more laser beams and detect a portion of the one or more laser beams scattered from the one or more space objects. The space objects detected and ranged by a lidar system may include asteroids, space debris, and/or other spacecraft, the latter, for example, in docking scenarios.

Although communication and situational awareness functionalities may be implemented within separate systems, it may be advantageous to combine at least portions of laser communication and lidar systems on a spacecraft. For example, the combined system of this disclosure may have a significantly lower cost as well as a smaller volume and/or weight relative to separate communicating and ranging systems.

Figure 1:
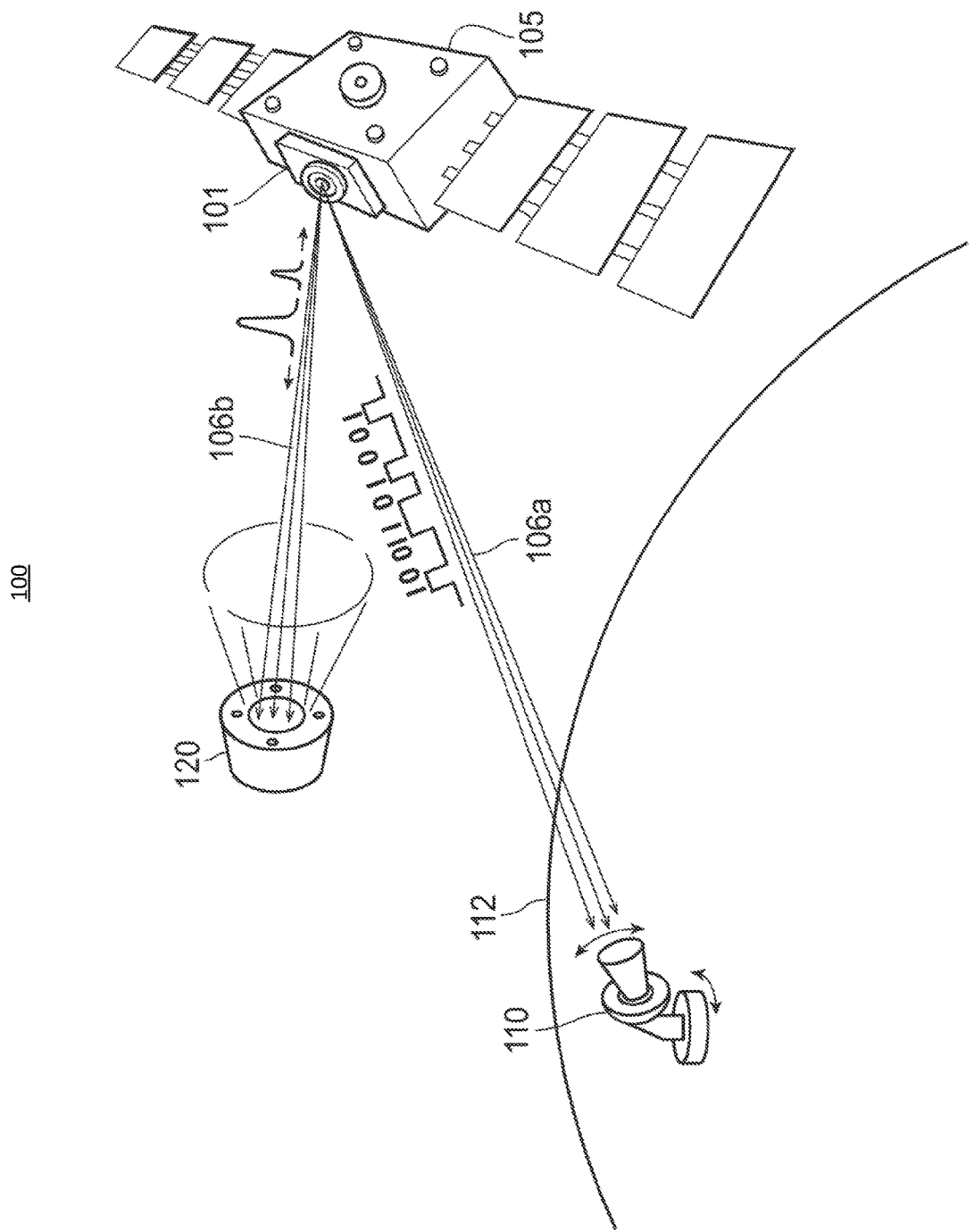
FIG. 1 illustrates an environment in which an integrated laser communication and ranging system of this disclosure may operate.

FIG. 1 illustrates an environment 100 in which an integrated communication system 101 disposed at or on a spacecraft 105 may operate. The system 101 may be configured to emit a communication beam 106a and a ranging beam 106b. In some implementations, the communication beam 106a and the ranging beam 106b may have the same wavelength and/or emitted by the same laser source included in a laser module of the system 101. In other implementations, the communication beam 106a and the ranging beam 106b may have different wavelengths and/or be emitted by distinct lasers included in a laser module of the system 101. Furthermore, in some scenarios and/or implementations, the system 101 may direct the beams 106a,b toward their corresponding targets concurrently, as described below.

The system 101 may direct the communication beam 106a toward a ground station 110 disposed at a suitable ground location 112 on Earth (or another suitable surface of a celestial body). Additionally or alternatively, the system 101 may direct the communication beam 106a toward a receiving station disposed at another spacecraft, a mobile terrestrial platform (e.g., on a ship or a land-based vehicle), or an aircraft. The system 101 may modulate the beam 106a to carry telemetry signals and/or other suitable data or information. Example modulation techniques for carrying information using the communication beam 106a are discussed below.

Directing the beam 106a toward a target such as the ground station 112 may require pointing precision of a small fraction of one degree (e.g., 1, 2, 5, 10, 20, 50, 100, 200, 500 arcsec). Scanning and alignment techniques for attaining the required pointing precision are discussed below.

In some implementations, the ground station 110 may emit at least one optical beam 116 toward the spacecraft 105. The beam 116 (or multiple beams) may carry telecommand or other suitable uplink data. The system 101 may detect the beam 116, decode the data transmitted using the beam 116, and, for example, communicate the decoded data to a flight computer. Additionally or alternatively, the system 101 may detect the beam 116, determine the angle of arrival (AOA), and use the angle of arrival to direct the communication beam 106b toward the ground station 110. Thus, the system 101 may use the beam 116 as an alignment beam. In some implementations, the ground station 110 may emit separate communication and alignment beams (e.g., beam 116), and the system 101 may detect and use the communication and alignment beams accordingly. In other implementations, the beam 116 may be the alignment beam (or multiple alignment beams) and the ground station 110 may use radio communications for uplink or telecommand.

The system 101 may direct the ranging beam 106b toward any suitable space object target 120 (e.g., asteroid, space debris, a satellite, a rocket, a propellant depot, etc.). In some implementations and/or scenarios, the ranging beam 106b may be configured to subtend the target, i.e. encompass the target cross-section within the beam cross-section at the target. In other implementations and/or scenarios, the ranging beam 106b may be configured to illuminate a portion (e.g., 0.1, 1, 10% or any suitable fraction of the cross-section area) of the target. In any case, the target may partially absorb and partially scatter (i.e., diffusely or specularly reflect, diffract, and/or refract) the light of the ranging beam 106b. The target may scatter a portion of the ranging beam 106b back toward the system 101. The system 101 may detect the scattered portion of the ranging beam and determine the range of (e.g., the distance and/or direction to) the target, according to techniques described below.

Figure 2:
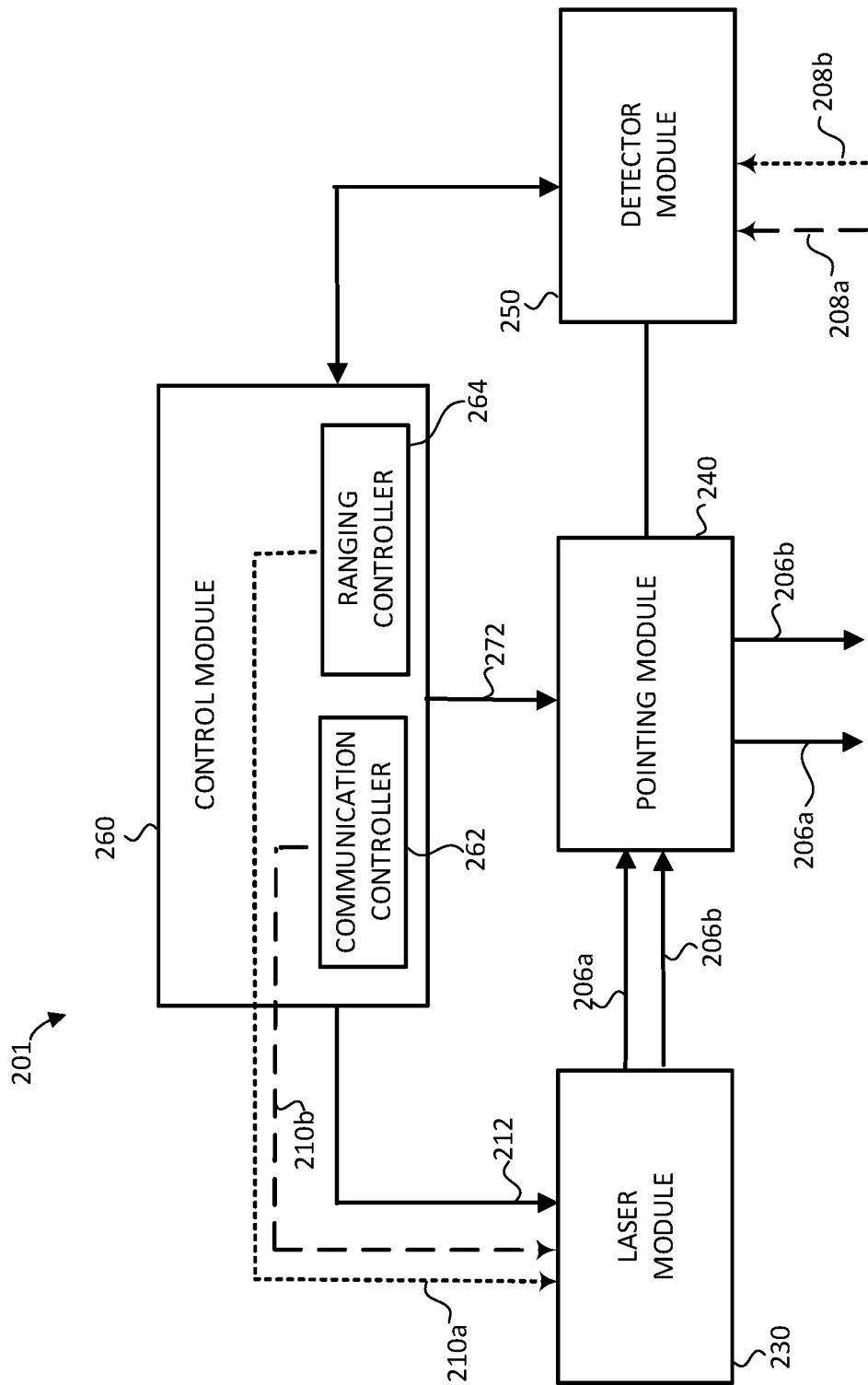
FIG. 2 is a block diagram of the example implementation of an integrated communication and ranging system of FIG. 1.

FIG. 2 is a block diagram of an example integrated communication and ranging system 201 that can operate as the system 101 on the spacecraft 105, for example. The system 201 can be configured to direct an outgoing communication optical beam 206a (for simplicity, "communication beam 206a") and an outgoing optical ranging optical beam 206b (for simplicity, "ranging beam 206b") using a shared pointing module. The system 201 in various implementations can direct the beams 206a, 206b in the respective directions at the same time or sequentially, as discussed in more detail below. In some implementations discussed below, inbound optical beams 208a and 208b also share at least a portion of the optical path, thereby further reducing the number of components, the volume envelope, and the cost.

An example implementation of the laser and optical guiding components of the system 201 is discussed first, followed by a discussion of example techniques for combining communication and ranging functionality in this system.

The system 201 may include a laser module 230 configured to emit at least one beam. The laser module 230 may be in optical communication with a pointing module 240. More particularly, there may be an optical path, free-space or guided, between the laser module 230 and the pointing module 240. To direct beams, the pointing module 240 may include various optical elements such as mirrors, lenses, optical fibers, etc. The pointing module 240 in operation directs the communication beam 206a emitted by the laser module 230 toward a ground station or another communication terminal. The pointing module 240 also may be configured to direct the ranging beam 206b toward an object in space (e.g., the target 120).

The pointing module 240 also may be in optical communication with a detector module 250, which may include at least one detector configured to detect a scattered portion of at least one beam, e.g., the laser beam directed toward a space object. The pointing module 240 may be configured to direct the portion of the laser beam scattered from the space object toward the detector module 250. That is, at least some of the light scattered by the space object may reach a detector in the detector module 250 via front-end optics of the pointing module 240. Additionally or alternatively, light (including the light of the beam scattered by the space object) may reach a detector in the detector module 250 without having passed through the optics of the pointing module 240. For example, the detector module 250 may include one or more detectors, coupled with wide angle receiving optics, capable of receiving light from a suitably wide range of angles.

The system 201 also includes a control module 260 in communicative connection with the laser module 230, the pointing module 240, and/or the detector module 250. As illustrated in FIG. 2, the control module 260 can include a communication controller 262 and a ranging controller 264. The communication controller 262 can generate data 210a and provide the data 210a to the laser module 230 for modulation, encoding, etc. The data 210a can be any suitable data which the spacecraft in which the system 201 is implemented transmits to a remote communication terminal. The laser module 230 can generate and modulate the communication beam 206a so as to convey the information 210a to the remote communication terminal. The communication controller 262 further can be configured to operate the pointing module 240 to direct the laser beam 206a, modulated with the data 210a, toward the remote communication terminal.

The ranging controller 264 can be configured to control the laser module 230, using a signal 210b, so to emit the ranging beam 206b. Thus, the laser module 230 can modulate the ranging beam 206b to produce a ranging signal distinguishable from the data signal of the communication beam 206a. The ranging controller 264 may modulate the signal 206b based on a variety of factors, including, for example, distance of the object from the spacecraft, number of tracked objects, and/or the operating mode of the system 201 (e.g., simultaneous or sequential ranging and communication). Further, the ranging controller 264 may be configured to operate the pointing module 240 to direct the ranging beam 206b toward a space object, which, in turn, may scatter a portion of the laser beam. Still further, the ranging controller 264 can be configured to determine, using one or more detectors of the detector module 250, a distance between the spacecraft at which the system 201 is disposed and a space object. More specifically, the ranging controller 264 can determine the distance based on a portion of the emitted laser beam modulated with a ranging signal, scattered by the space object, and detected by the detector module 250. As further discussed below, the control module 260 also can generate a control signal 212 to activate and deactivate the laser module 230, control the power (e.g., apply more power to the communication beam 206a than to the ranging beam 206b), and otherwise control other operational parameters of the laser module 230.

The laser module 230 may include one or more laser sources. The laser sources may be semiconductor, solid-state, dye, and/or gas lasers distinguished by the type of a gain medium. Laser structure may include Fabry-Perot or ring cavities in free-space or guided configurations. The laser module 230 may include a laser source configured for tunable wavelength operation using, for example, an external cavity configuration. In some implementations, the same laser may generate more than one wavelength at the same time. A laser in the laser module may be configured for pulsed operation using mode-locking, Q-switching, or another suitable technique.

Semiconductor lasers may be advantageously used in the laser module 230. While other laser types may require optical pumping or plasma discharge to energize the gain medium, the gain in semiconductor lasers may be controlled by injecting electrical current into a built-in diode junction. Consequently, semiconductor lasers may be directly modulated by varying the current injection. Furthermore, semiconductor lasers offer flexibility in designing for a specific wavelength or a tunable wavelength range. A variety of semiconductor laser types may be included in the laser module 230, including Fabry-Perot (FP), distributed Bragg grating (DBR), distributed feedback grating (DFB), and/or vertical cavity surface-emitting lasers (VCSELs).

The laser module 230 may include more than one laser source, each configured to emit a corresponding beam. The beams emitted by multiple laser sources may have the same wavelength or different wavelengths. The beams at the same wavelength may originate from coupled laser arrays (e.g., VCSEL arrays) and may be combined into a steerable beam. Additionally or alternatively, beams with different wavelengths may be combined into a common optical path using a variety of beam combining optics, including, for example, dichroic mirrors.

For implementations in which beams from multiple laser sources are guided along separate paths, it may be advantageous to combine the distinct laser sources into the same laser module 230, for example, to combine certain aspects of packaging. In some instances, using a multi-source laser module may combine thermal control components or take advantage of shared coupling elements (e.g., lenses, fiber arrays, etc.).

Thus, the laser module 230 may include a single laser emitting a single beam, a single laser emitting more than one beam, multiple lasers emitting multiple beams, or multiple laser with outputs combined into a single beam. In implementations with multiple lasers, each laser may be modulated separately or a common modulation may be applied to multiple lasers. The modulation may be external, implemented with external modulators, or direct, implemented by varying the energy pumped into the gain medium (e.g., via current injection in semiconductor lasers). Furthermore, each of the one or more lasers in the laser module 230 may be operated in a pulsed or in a continuous wavelength (CW) mode. Implementations with various laser configurations of the laser module 230 are further discussed below in the context of operation of the system 201.

One or more connections between the laser module 230 and the pointing module 240 may include guided (e.g., by fiberoptic cables) or free space connections. The pointing module 240 may include optical, mechanical, electrical components to further direct one or more beams in a prescribed direction. It should be appreciated that, in some implementations, the laser module 230 also may affect some of the changes in the pointing direction of one or more emitted laser beams. That is, in some implementations, the laser module 230 and the pointing module 240, may cooperate in determining the direction of the laser beams emanating from the system 201.

The pointing module 240 may include collimating optics to achieve a suitable beam width. The beam width requirement may then translate into the size requirement for the pointing optics. The size of the largest element of the pointing optics may be chosen to exceed the beam width. Notably, the size of the optics may significantly contribute to the mass of the system 201. The suitable beam width, in turn, may be chosen based on the desired spread of the beam, as the angular spread of the beam may be inversely proportional to the beam width (e.g., for a Gaussian beam) for a given wavelength. Smaller angular beam spread may result in a higher power delivered to a receiver (e.g., at the ground station 110). On the other hand, decreasing the angular beam spread may place a more stringent requirement on pointing accuracy. The collimating optics of the pointing module 240 may set the beam spread angle to a small fraction of one degree (e.g., 1, 2, 5, 10, 20, 50, 100, 200, 500 Arcsec). It should be noted that a beam may be anisotropic, with different spread angles along different axes (perpendicular to propagation direction).

In some implementations, the pointing module 240 also may serve as a front end of an optical receiver. In such implementations, increasing the size and the numerical aperture (NA) of the front end optics may increase the power collected by the receiver and, thus, improve the sensitivity of the receiver with respect to irradiance. Increasing the NA of the receiving optics is thus beneficial for receiving the scattered portion of the emitted beam in for ranging and/or for receiving telecommand or beacon signals from the ground station.

The collimating optics may include, for example, one or more mirrors, one or more lenses, or a suitable combination of lenses, prisms, and/or mirrors. In some implementations, the collimating optics may include one or more diffractive elements and/or adaptive optics, for example, for controlling (e.g., homogenizing) beam phase.

The pointing module 240 may perform collimation in multiple stages. For example, a beam emitted by the laser module 230 may be collimated by an optical element of the laser module 230 or the first collimating stage of the pointing module 240. The pointing module 240 may include a focusing element that focuses the beam collimated by the first collimating stage onto an intermediate focal plane. A second stage of collimating optics may collimate the focused beam with a new beam width that may be larger than the beam width after the first collimating stage. The combination of the laser module 230 and the pointing module 240 may include more than two collimating stages. Multiple collimating stages may provide flexibility in directing the beams emanating from the system 201.

The pointing module 240 may use any one or more of a variety of techniques to direct one or more beams emitted by the laser module 230. For example, the pointing module 240 may include a mirror mounted on a two-axis gimbal with rotation around each axis controlled by a servo motor (or another suitable type of motor). Motor position for each axis of the gimbal may determine, at least in part, the pointing direction of a reflected beam. In some implementations, two separate mirrors, each controlled by a dedicated actuator (e.g., motor, galvanometer, etc.) or a set of prisms (e.g., Risley prisms) may direct a beam, e.g., each along a corresponding direction. Additionally or alternatively, the pointing module 240 may include fast-steering mirrors with voice coil, piezo, or other suitable actuators. In some implementations, the pointing module may include micro-electromechanical systems (MEMS) for steering beams. Furthermore, the pointing module 240 may use materials with variable index of refraction and/or birefringence (e.g., liquid crystals) to steer beams by shaping beam phase fronts (e.g., via dynamic metasurfaces). Still furthermore, the pointing module may 240 may perform steering by laterally displacing substantially focused (i.e., small beam waste, high divergence) beams in one of the focal planes of an optical system of the pointing module 240. In general, the pointing module 240 may use one steering technique at one stage of an optical path (e.g., with a smaller beam waste) and another steering technique at another stage (e.g., with a larger beam waste).

Each steering technique may have trade-offs among speed (i.e., angular slew rate), precision, stability, and/or range of angles. A combination of steering techniques may allow the pointing module 240 to use one technique for coarse pointing and another for finer pointing. For example, an FSM along the optical path may add speed and precision, while a nested gimbal may add the range of pointing angles.

The detection module 250 includes one or more detectors configured to detect light directed toward the system 201. For example, a detector may be configured to detect a scattered portion of a laser beam emitted by the laser module 240. The same detector also may be configured to detect a laser beam emitted by another communication system or node (e.g., at ground station 110, another spacecraft, etc.) in the direction of the system 201. Furthermore, a ground station or another communication node may emit a laser beacon in the direction of the system 201 to help with finding the pointing direction. In some implementations, the detector may be configured to detect the beacon to find the corresponding direction of arrival (DOA).

It should be noted that distinct detectors may perform different functions of the detector module 250. For example, one detector may be dedicated to detecting scattered light from a laser beam emitted by the system 201, another detector may be dedicated to detecting optical communication signals, and still another detector may be dedicated to detecting optical beacons. Distinct detectors may have different configuration, spectral sensitivity (e.g., via material design and/or integrated filters), and speed of detection limitations. On the other hand, in some implementations, the same detector may serve multiple functions. For example, the same detector may detect scattered light for ranging and beacon light from another communication node and/o a ground station. To that end, the laser beam for ranging may have a wavelength suitably close to the wavelength of the beacons.

The one or more detectors of the detector module 250 may include photodiodes. The photodiodes may be PIN (positively doped, intrinsic, negatively doped layers), or APD (avalanche photodiodes), depending, for example, on required sensitivity. In some implementations, the detection module 250 may include one or more photo-multipliers, single-photon APD, superconducting nanowires, and/or other suitable photon-counting detectors. Furthermore, the detector module may include one or more arrays of photodetectors for implementing detection of scattered light for ranging, detection of alignment beacons, and/or for detecting communication signals. Quadrature photodetectors (QPDs), complimentary metal-oxide-semiconductor (CMOS), or charge-coupled device (CCD) focal plane arrays (FPAs) may detect spatial distribution and/or DOA of impinging light.

In operation, generally described below in the context of the control module 260, an imaging sensor included in the detection module 250 may help identify targets for ranging. For example, using an imaging sensor of the detector module 250, the system 201 may identify one or more candidate targets and determine corresponding estimates of orientation (i.e., direction) of the candidate targets with respect to the system 201. In response to determining the estimates of orientation to the candidate targets, the system 201 may use the pointing module 240 to direct the ranging beam 206b to one or more of the identified candidate targets, and determine corresponding distances using the scattered ranging beam. More generally, the system 201 may use imaging sensor data combined with ranging data to increase situational awareness of the spacecraft.

In some implementations, at least one of the detectors of the detector module 250 may use some of the optical elements of the pointing module 240. For example, front-end optics of the pointing module 240 may collect light for at least one of the detectors in the detector module 250. Thus, a detector in the detector module may have a look direction varying with the pointing direction determined by the pointing module 240. On the other hand, one or a combination of photodetectors may cover a range of look directions that do not change with the pointing direction of any emitted beams, but remain static in the frame of the spacecraft. Still in other implementations, the pointing module 240 may control the look direction of a detector independently of laser beam pointing directions using the pointing techniques described above.

The control module 260 may include one or more processors and a memory unit to process signals received from the detector module 250 and/or other sensors and determine appropriate actions according to instructions loaded into the memory unit. Generally, control module 260 may be implemented using any suitable combination of processing hardware, that may include, for example, digital signal processing (DSP) circuits, applications specific integrated circuits (ASICS) or field programmable gate arrays (FPGAs), and software components.

The control module 260 may be configured to control power (e.g., turning on, turning off, adjusting power level), operating mode (e.g., continuous, pulsed), wavelength (if tunable), and/or modulation of each of the laser sources in the laser module 230. The control module 260 can provide these parameters to the laser module 230 using the signal 212, as discussed above. The control module 260 also may be configured to control the pointing module 240 to set pointing direction and/or beam angle for each or any of the beams emitted by the laser module 230 (signal 212 in FIG. 2). Furthermore, the control module 260 may control various parameters (e.g., range, slew rate, etc.) of a scan, e.g. using the pointing module 240, of each or any of the laser beams emitted by the laser module 230.

The control module 260 may be communicatively connected to a flight computer on the spacecraft at which the system 201 is disposed. The control module 260 may be configured to perform operations of the systems 201 in response to signals received from the flight computer. Additionally or alternatively, the control module 260 may send signals to the flight computer based on received communication data and/or determined position information of a space object.

In operation, the system 201 may remain in a low power mode (e.g., with lasers off, amplifiers off, and/or reduced power to other components) until receiving an activation signal from the flight computer, a timing circuit, a ground station, and/or another suitable source. For example, the flight computer may determine that the spacecraft is in direct view of (i.e., has a line of sight to) the ground station (e.g., ground station 110) and, upon activating the system 201, send a signal to the control module 260. The signal to the control module 260 may include information about the relative position and orientation of the spacecraft and the ground station.

In some implementations, the control module 260 may obtain at least some of the information about the relative position of the spacecraft and the ground station without relying on the flight computer. For example, the system 201 may include a database configured to store approximate positions of objects in space at respective times. A timer circuit of the system 201 may cause the system 201 to switch from a low power mode into an active mode based on the data in the database.

The database may include the projected flight path of the spacecraft at which the system 201 is disposed and/or projected trajectories of space objects (e.g., payload, propellant depots, etc.) with which the spacecraft may need to dock. Additionally or alternatively, the database may include trajectories of space objects to avoid (e.g., asteroids, space debris, etc.). Furthermore, the database may include star maps which, in combination with data from on-board imaging sensors may aid in determining position and orientation of the spacecraft. The database may be stored in memory of the control module 260 or memory in communicative connection with the control module 260.

Additionally or alternatively, the control module 260 may be in communicative connection with navigational sensors (e.g., GPS, digital cameras, inertial sensors, etc.). Thus, the control module 260 spacecraft position and orientation based on data from the flight computer, the database, and/or navigational sensors. Additionally or alternatively, the controller may determine spacecraft position and orientation based on external beacons and/or other communication signals.

Based on the signal from the flight computer and/or information stored at and/or computed by the system 201, the control module 260 may estimate the orientation of the line of sight to the ground station with respect to the spacecraft. The control module 260 may then cause the pointing module 240 to align so as to direct an emitted beam (e.g., the ranging beam 206a) toward the ground station. In some implementations, the laser module 230 may turn on a laser source after the alignment of the pointing module is complete. In other implementations, the laser source may be on for at least a portion of the alignment process.

In some implementations, to complete the alignment, the system 201 may use the detector module 250. For example, a detector in the detector module 250 may have substantially the same line of sight as, or, at least, an overlapping field of view with a laser beam emitted toward the ground station. As described above, the ground station may emit one or more beacon beams. The detector may detect a beacon beam, and the detector module 250 may generate a signal to send to the control module 260 based on the detection of the beacon beam. The control module 260 may then cause the pointing module 240 to adjust so as to improve alignment based on the detection of the beacon beam. In some implementations, the detector module 250 may send to the control module 260 a received signal strength indication corresponding to the detection of the beacon beam. The control module 260 may then adjust the pointing of the pointing module 240 so as to maximize the received signal strength. For example, the control module 260 may cause the pointing module 240 to scan over a suitable range of angles and choose the angle with maximum strength of the beacon. In other implementations, the signal strength may be a control variable and the control module 260 may use a suitable closed loop control algorithm to maximize signal strength. Additionally or alternatively, the detector configured to detect the beacon beam may collect spatial information pertaining to the beacon beam. For example, FPA or QPD detectors may detect spatial variation that the detector module 250 may send to the control module 260. The control module 260 may then adjust the pointing angle of the pointing module 240 at least in part based on the spatial information detected by the detector module 250. The control module 260 may use the spatial information, like the signal strength indication, either in an open loop scan, or a closed-loop optimization algorithm. It should be noted that the detector for a beacon also may be configured to detect spatial distribution of light from a laser beam emitted by the laser module 230 and scattered by a space object.

In some implementations or scenarios, the ground station may use the communication beam as the beacon beam. For example, the ground station may increase the divergence of the beam and reduce the data rate (or use a CW mode) to facilitate detection by the detector module 250.

Additionally or alternatively, the system 201 may emit a laser beam during the alignment process and the ground station may detect alignment by detecting power or position of the beam emitted by the system 201. The ground station may then send an indication of alignment via an optical communication beam or via a radio link. The system may adjust the alignment of the pointing module 240 based on the indication of alignment received from the ground station.

In summary, the system 201 may align a beam emitted by the laser module 230 with the ground station or another suitable target using a one or more of a variety of techniques. Using the pointing module 240, the system 201 may conduct coarse scans and/or fine scans, while detecting, using the detector module 250, power of a beacon beam or communication beam from the ground station, or receiving an indication of alignment from the ground station. Additionally or alternatively, the system 201 may use the control module 260 to perform closed-loop optimization for received power and/or beam position at the detector module 250 or at the ground station (using signals from the ground station).

Upon completing at least a portion of the alignment process, the communication controller 262 may activate the laser module 230 (if it had not been activated) and cause the laser module 230 to emit a beam directed (by the pointing module 240) to the ground station. Once the alignment is at a suitable level, the system 201 and the ground station may initiate data communication, exchanging telemetry and telecommand messages. It should be noted, that for certain orbits (i.e., LEO), the ground station may remain in view of the spacecraft for less than 20 minutes, and the alignment process may be configured to complete in 1, 2, 5, 10, 20, 50, or 100 seconds. Furthermore, the communication link path loss may vary with spacecraft elevation with respect to the ground station. Consequently, the system 201 may be configured to vary modulation and/or rate, increasing data rate as the path loss decreases, and decreasing data rate as the path loss increases.

The system 201 also may transition to active from a low power mode when the spacecraft is in range of a space object that may be a tracking or ranging target for the system 201. In some implementations, a flight computer may activate the system based on determining that a target may be in range. In other implementations, the system may be configured to determine that a target is in range without relying on the flight computer. In some implementations, the system 201 may be configured to interrogate the database that stores approximate positions of objects in space at respective times and determine that a target may be in range. Furthermore, the control module 260 may be configured to determine a general orientation of the target (i.e., space object) relative to the spacecraft using the database. Additionally or alternatively, the system 201 may use an imaging sensor disposed at the spacecraft (e.g., as a part of the detector module 250) to determine the general orientation of the target to the spacecraft. Based on the determined general orientation of the target to the spacecraft, the system 201 may adjust, using the control module 260, the pointing module 240 so as to direct a laser beam emitted by the laser module 230 toward the target. Additionally or alternatively, the system 201 may communicate with the flight computer to orient the spacecraft so as to facilitate directing the laser beam toward the target.

In some implementations, directing a laser beam toward a target for the purpose of ranging may include aligning the pointing module 240 based on detecting a portion of the laser beam scattered by the target. For example, in response to determining the general orientation of the target with respect to the spacecraft, the system 201 may align the pointing module 240 to direct a laser beam in the general direction of the target. The general direction of the target may be within a suitable angle (e.g., 1°, 2°, 5°, 10°, 20°, etc.) with respect to the line of sight to the target. The system 201 may then turn on a laser source of the laser module 230 so as to emit a laser beam in the general direction of the target. The laser module 230 and/or the pointing module 240 may cooperate to adjust the divergence angle of the emitted beam to a suitable angle (e.g., 1°, 2°, 5°, 10°, 20°, etc.) so as to increase the possibility of illuminating the target in view of imprecise alignment. The system 201 may use the detection module 250 or another suitable detector to detect a scattered portion of the illuminating laser beam directed toward a target. Using a spatially-sensitive detector (e.g., FMA, QPD, etc.), the system 201 may estimate the AOA of the scattered portion. The system 201 may then increase the precision of alignment based on the AOA of the detected scattered portion of the emitted beam. Additionally or alternatively, the system 201 may scan, using the pointing module 240, the pointing direction of the emitted beam over a suitable range of angles to maximize power of the scattered portion detected by the detection module 250. In some implementations, the control module 260 may implement a suitable feedback control algorithm to improve the pointing direction based AOA and/or detected power of the scattered portion of the illuminating beam.

In summary, directing a laser beam toward a target for ranging may include one or more alignment techniques. An alignment procedure may include detecting a portion of a beam emitted by the laser module 230 and scattered by the object. Additionally or alternatively, the alignment procedure may include using an imaging sensor to estimate the direction to the target. An initial estimate of the general alignment between the spacecraft and the target may be based on the database of projected positions of space objects.

After aligning, using the pointing module 240, a laser beam path to the target, the system 201 may determine the distance between the spacecraft and the target using the aligned laser beam. To that end, the laser module 230 may modulate the laser beam directed to the target. In some implementations, the laser module 230 may emit the laser beam in a sequence of pulses. The detector module 250 may detect the pulses scattered from the target and the system 201 may determine time of flight (TOF) based on the time difference between emitted and detected pulses. In another implementation, the laser module 230 may modulate the emitted beam with a variable frequency sinusoidal signal, e.g., with the frequency linearly chirped over a suitable time period. The system 201 may then determine time of flight (TOF) based on the instantaneous modulation frequency difference between the emitted laser beam and the portion of the beam scattered by the target and detected using the detector module 250. In yet another implementation, the laser module 230 may modulate the beam with a sum of several sinusoids of suitably chosen frequencies. The system 201 may then determine time of flight (TOF) based on the phase differences of the sinusoids between the emitted laser beam and the portion of the beam scattered by the target and detected using the detector module 250. The system 201 may estimate the distance between the spacecraft and the target by multiplying the TOF by the speed of light and dividing by two (accounting for the round trip).

The communication and ranging modes of the system 201 are discussed next with continued reference to FIG. 2. The system 201 can operate in these modes concurrently or sequentially, as discussed in more detail below.

In some implementations, the system 201 may be configured to operate in one of two active modes at a given time. For example, in the first mode (a "communication mode"), the control module 260 may cause the laser module 230 to emit the communication beam 206a and cause the pointing module 240 to direct the communication beam 206a toward a ground station (e.g., ground station 110) to establish a communication link. Accordingly, the control module 260 may be configured to cause the communication beam 206a to be modulated to transmit data to the ground station. In some implementations, the control module may be configured to send data to the laser module 230, and the laser module 230 may include a modulating circuit to modulate the laser beam with the data transmitted by the control module 260. In other implementations, the control module 260 may include the modulating circuit to modulate one or more lasers of the laser module 230. Thus, the control module 260 may modulate the communication beam 206a.

The modulating circuit may modulate the communication beam 206a directly or externally, i.e. using an external modulator. In some implementation, the laser may operate in a pulsed mode, and the modulating circuit may control mode-locking or Q-switching, affecting pulse frequency. In external modulation, the modulating circuit may vary current through or voltage applied across the external modulator. In some implementations, the external modulator may be an amplifier, such as an erbium-doped fiber amplifier (EDFA), a semiconductor optical amplifier (SOA), etc. In other implementations, an amplifier may include a switch or an interferometer, such as a Mach-Zehnder modulator (MZM). Additionally or alternatively, an external modulator may include an electro-optic crystal to control laser phase in response to a changing voltage.

The modulating circuit may be configured to modulate the communication beam 206a using one or more modulation schemes to generate an optical signal. In some implementation, the modulation scheme may be on-off keying (OOK), varying the beam intensity to represent (encode) a bit stream. The modulation may be a no-return-to-zero (e.g., NRZ-OOK) scheme. In other implementations, a differential phase-shift keying (DPSK) may encode the bit stream using a difference in phase between successive time slots of the optical signal. Still in other implementation, a pulse-position modulation (PPM) or pulse-width modulation (PWM) may represent the bit stream as positions of and/or time between pulses or pulse widths, respectively. OOK, DPSK, PPM or PWM schemes may be used without a coherent detector at the ground station. In some implementations, a pulse-shift keying (PSK) scheme may encode the bit stream as phases of the optical signal. The ground station may use a coherent detector to demodulate the optical signal. With some of the techniques above, the modulation may include quadrature or M-ary encoding schemes.

In some implementations, a digital signal may be modulated onto a radio-frequency (RF) signal. The modulation circuit may then modulated the laser beam with the modulated radio-frequency signal. Modulation may include frequency encoding or modulation, either by directly varying laser wavelength or by changing frequency of a modulating RF signal.

In another mode of the system (a "ranging mode"), the control module 260 may cause the laser module 230 to emit the ranging beam 206b and cause the pointing module 240 to direct the ranging beam 206b toward a target. After the detector module 250 detects the portion of the beam scattered by the target, the detector module 250 may generate, using a detection circuit, a signal indicative of the distance to the target and send the signal to the control module 260. The control module 260 may send a signal indicative of the distance to the target to the flight computer which may use the distance in navigation and/or docking procedures.

Additionally or alternatively to the ranging techniques described above, the system 201 may use one or more of the communication modulation techniques to aid in determining distance to the target. To that end, the detector module 250 may generate a signal corresponding to a correlation between the sent communication signal and the detected signal as a function of time. In some implementations, the detector module 250 may include an equalization circuit to compensate, for example, for multipath effects generated by scattering of the modulated laser beam from the target. The detector module 250 may generate the correlation signal using analog and/or digital circuits. In some implementation, the detector module 250 may include an optical heterodyne receiver. The optical heterodyne receiver may aid in determining a correlation between transmitted and received signals.

In some implementations, operations of the system 201 in the communication mode and in the ranging mode do not overlap in time. That is, during a given time interval of a suitable length (e.g., greater than 1 sec, 10 sec, 1 min, 10 min, etc.) the system 201 may operate only in the communication mode, only in the ranging mode, or neither. To transition from the communication mode to the ranging mode or vice-versa, the control module 260 may direct the pointing module 240 to reorient an optical path of a beam emitted by the laser module 230. Reorienting the optical path may include reorienting the spacecraft. Additionally or alternatively, reorienting the optical path may include engaging a motor to orient front end optics to change the range of pointing directions for an emitted laser beam and/or field of view for a detector in the detector module 250.

In other implementations, the system 201 may be configured to operate in the communication and ranging modes substantially concurrently. That is, a time interval between directing a laser beam modulated to carry data and directing a beam to target for ranging may be smaller than, for example, 1, $\frac{1}{10}$, $\frac{1}{100}$, $\frac{1}{1000}$ of a second. In some implementations, the system 201 may operate in both modes simultaneously. That is the system 201 may perform ranging and communication operations substantially independently, sharing one or more system components during the simultaneous operation. Various configurations of the system 201 for concurrent ranging and communication operation are described below in FIGS. 3-4 and 6-7. The control module 260 is omitted to avoid clutter, but the role of the control module 260 should be appreciated in the configurations described below in view of the discussion above.

Figure 3:
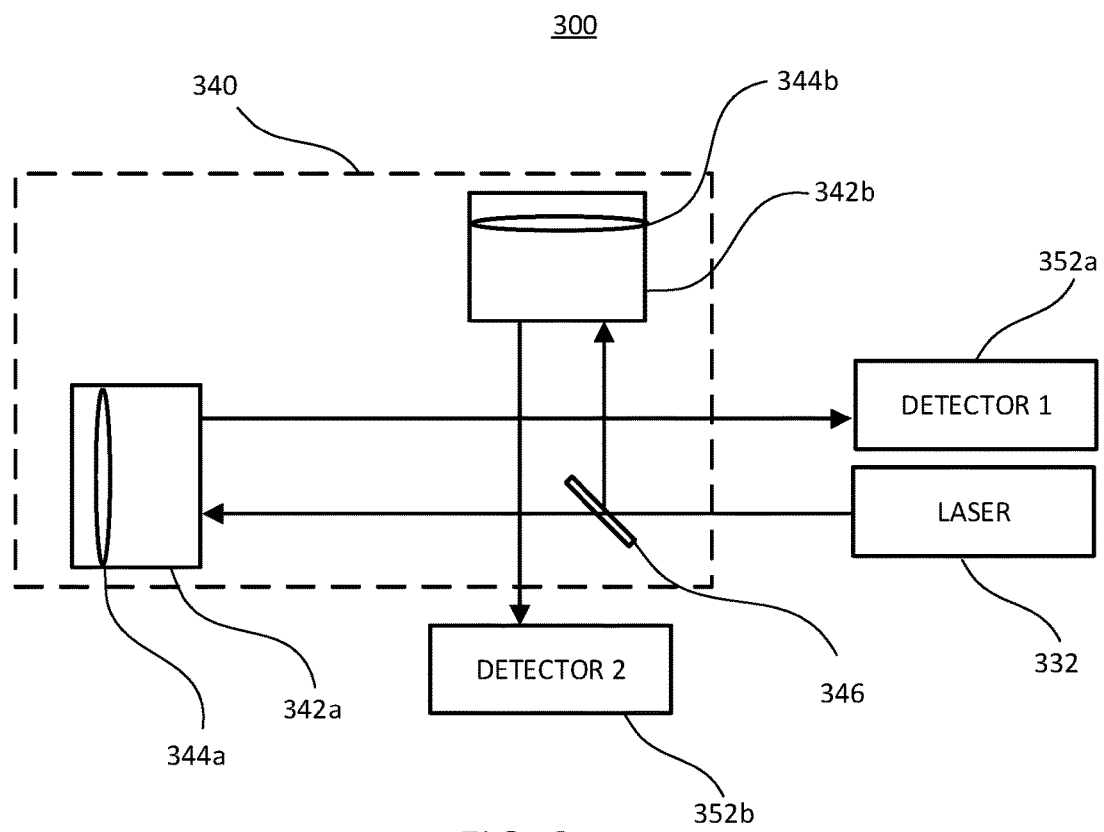
FIG. 3 schematically illustrates a configuration of the example system in FIG. 2 suitable for concurrent communication and ranging operation.

FIG. 3 schematically illustrates a configuration 300 of the system 201 suitable for concurrent communication and ranging operation. In the configuration 300, the laser module 230 may include a laser 332 configured to emit a beam that may be modulated for communication and/or ranging. A pointing module 340 (e.g., pointing module 240) may direct the beam to a ground station (e.g., ground station 110) for communicating data and/or to a target (e.g., object 120) for determining distance to the target. To that end, the pointing module 340 may include two pointing heads 342a,b with front-end optical assemblies, 344a,b, respectively. Each of the front end optical assemblies 344a,b may include a suitable combination of lenses and mirrors. Each of the pointing heads 344a,b may include mechanisms for directing an optical beam, as described above. The pointing head 344a may be dedicated to directing the communication laser beam to the ground station, while the pointing head 344b may be dedicated to directing the ranging beam to the target.

A splitter 346 may partition the beam emitted by the laser 332 and direct two portions to the respective pointing heads 342a,b. In some implementations, the splitter 346 may be a free-space beam splitter. In other implementations, the splitter 346 may be a fiberoptic splitter. The splitter may split the emitted beam in a suitable power ratio (e.g., 1:49, 1:9, 1:3, 1:1, 3:1, 9:1, 49:1, etc.). In some implementations, the power ratio may be controlled by the control module 260. For example, the beam splitter may be a polarization beam splitter, and the control module 260 may be configured to control polarization of the beam emitted by the laser 332. Additionally or alternatively, the control module 260 may control a voltage applied across an electro-optic tuning section, use liquid crystals, or vary the power ratio with any other suitable technique.

The pointing head 342a with the front-end optics 344a may be configured to direct the received beacon and/or communication beams from the ground station to detector 352a. The pointing head 342, on the other hand, may be configured to direct the scattered portion of the ranging beam to detector 352b. In some implementation, the splitter 346 may extend in space or may be otherwise configured to direct the light collected by each pointing head 342a,b to both of the detectors 352a,b. The detectors 352a,b may have different spectral sensitivity and/or the paths to the detectors 352a,b may include filters to either transmit a signal from the ground station or the beam scattered by the target. In some implementations, both detectors 352a,b may detect the communication signal from the ground station and/or the scattered ranging signal.

Figure 4:
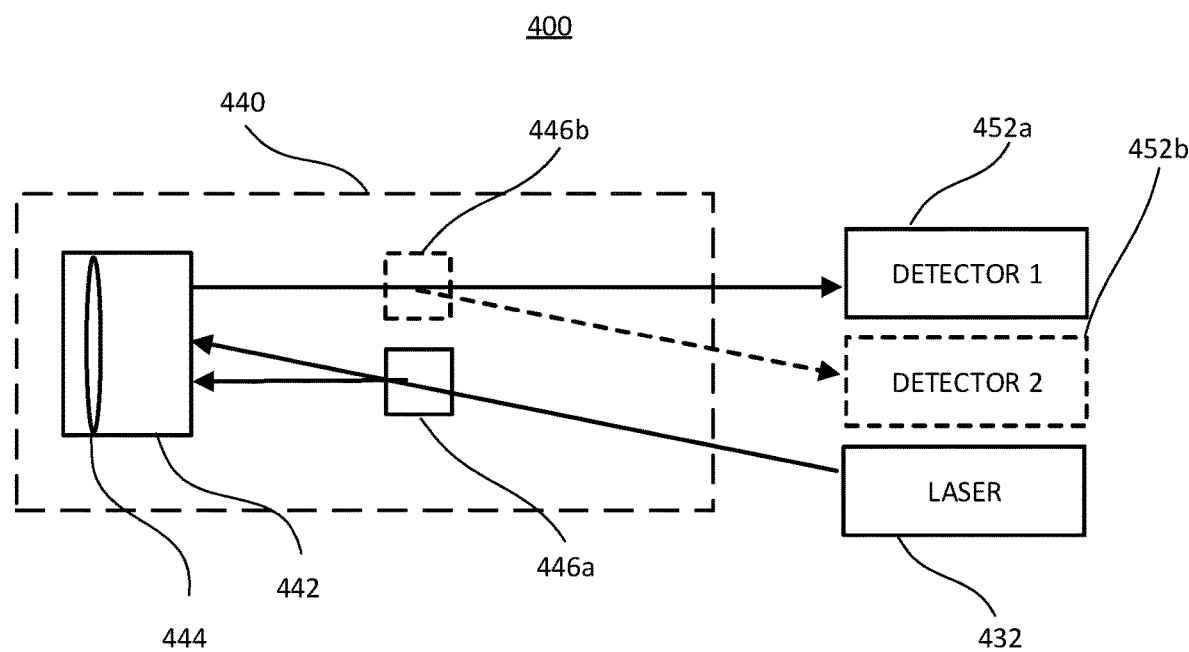
FIG. 4 schematically illustrates another configuration of the system in FIG. 2 suitable for concurrent communication and ranging operation.

FIG. 4 schematically illustrates another configuration 400 of the system 201 suitable for concurrent communication and ranging operation. In the configuration 400, the laser module 230 may include a laser 432 configured to emit a beam that may be modulated for communication and/or ranging. A pointing module 440 (e.g., pointing module 240) may direct the beam to a ground station (e.g., ground station 110) for communicating data and/or to a target (e.g., object 120) for determining distance to the target. Unlike the configuration 300, the pointing module 440 may include a single pointing head 442 with a front-end optical assembly 444.

The pointing head 442 may include two beam guiding elements 446a,b. The guiding elements 446a,b may include splitters, switches, steerable mirrors (e.g., FSMs, MEMS-driven mirrors, etc.), and/or other optical elements (e.g., collimating or focusing mirrors or lenses, prisms, fibers, etc.). The guiding elements 446a,b may be substantially smaller and lighter (e.g., less than 5% of the mass) than the pointing head 442. The guiding element 446a may be configured to direct a beam emitted by the laser 432, through the pointing head 442 toward a ground station and/or the target. To that end, the guiding element 446a may focus the beam emitted by the laser 432 onto a focal plane of the front-end optical assembly 444 with a suitable off-axis displacement. The off-axis displacement may then lead to an off-axis angular deviation of the beam directed by the pointing head 442. Thus, in a sense, the guiding element 446a may cooperate with the pointing head 442 to steer one beam or two beams simultaneously. The pointing head 442 may select a field of view subtending both, the target and the ground station, while the guiding element 446a may fine tune pointing directions to the target and the ground station. In some implementations, the guiding element 446a may set an angle between the direction of the target and the ground station, and the pointing head 442 may align the two direction to the target and the ground station, respectively.

In some implementations, the guiding element 446a may be configured to split the beam emitted by the laser 432 and focus portions of the split beam at different of-axis locations in the focal plane of the front-end optics 444. In other implementations, the guiding element may be configured to rapidly (e.g., in less than 1, 1/10, 1/100, or 1/1000 s) switch the off-axis locations in the focal plane of the front-end optics. Rapid switching of the beam between the ground station and the ranging target may allow concurrent operation by time-domain-multiplexing of ranging and communications. It should be appreciated, that configuration 400, may allow the system 201 to receive communication messages from the ground station and/or scatter from the target independently of the instantaneous pointing direction of the emitted beam.

In some implementations, the configuration 400 may include two detectors 452a,b, designated, respectively, for communication and ranging. Because optical scatter from the target and an optical signal from the ground station may be at different wavelength, the guiding element 446b may guide each wavelength to a corresponding detector. Additionally or alternatively, the guiding element 446b may be configured to switch receiving paths between the two detectors 452a,b. Still, in some implementations, one detector 452a may be configured to detect a signal from the ground station and the scatter from the target, obviating the need for the second detector 452b.

Figure 5B:
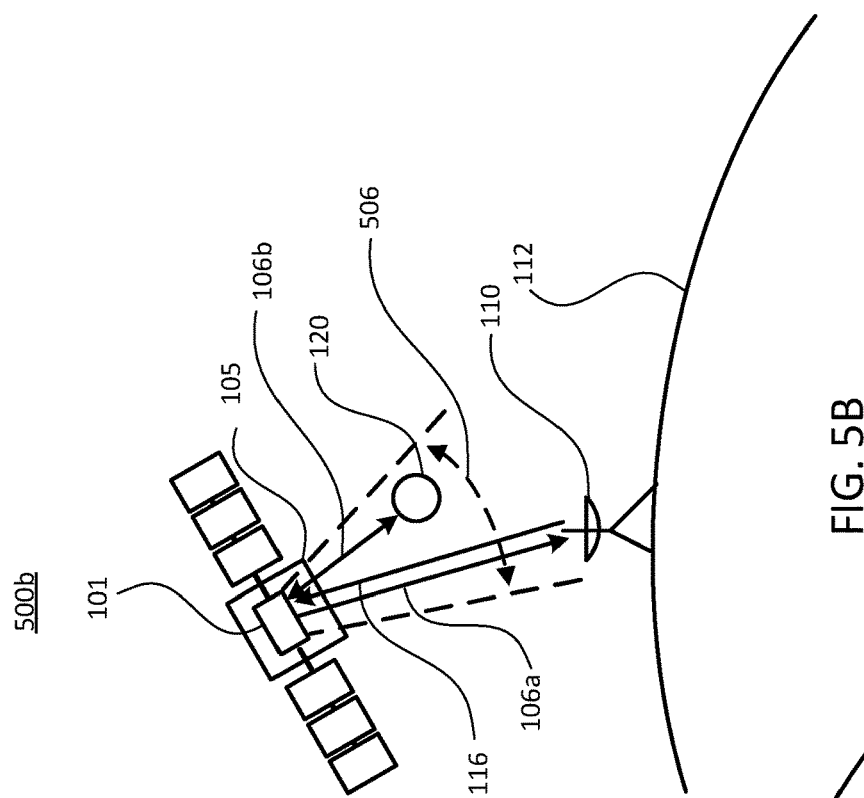
FIGS. 5A and 5B illustrate an environment in which the configuration of the system in FIG. 4 may operate.
Figure 5A:
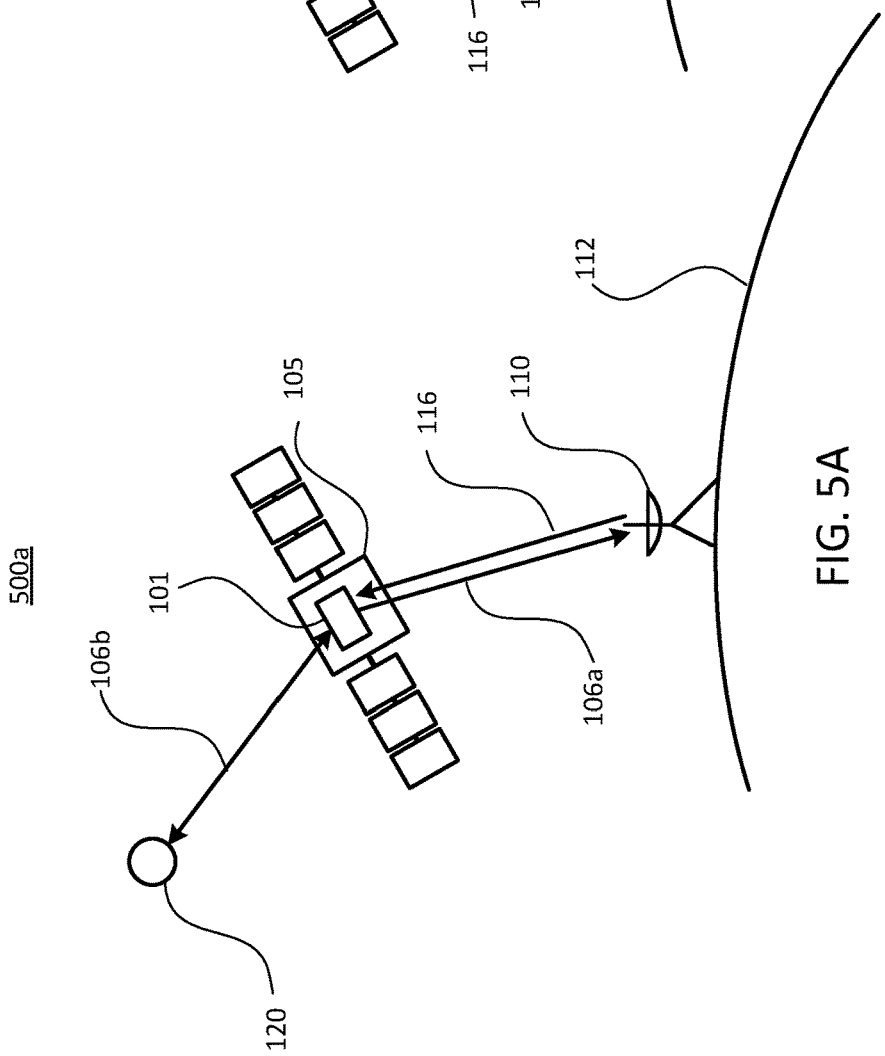

FIGS. 5A and 5B schematically illustrate example scenarios 500a,b in which the system 101 or 201 may operate. The system 101 or 201 in these scenarios can be implemented according to the configuration 400, for example. In the scenario 500a, the target 120 and the target 110 are disposed on different sides of the system 101. The scenario 500b differs from the scenario 500a in that the system 101 and the spacecraft 105 are oriented so as to have the target 120 and the ground station 110 in a field of view 506 of the system 101 (e.g., of the pointing head 442). The angular extent of the field of view 506 in a given direction may be 1, 2, 5, 10, 20 degrees or another suitable angle. In some implementations, the system 101 may cooperate with the flight computer of the spacecraft 105 to maneuver the spacecraft 105 to place the target and the ground station within the field of view 506. The system 101 may then operate concurrently in a communication mode and a ranging mode. In particular, the concurrent communication may be useful when the spacecraft 105 engages in a docking procedure with the object 120 while communicating with the ground station 120.

In some implementations, it is advantageous to transmit communication to a ground station using one wavelength and perform ranging using a different wavelength. Additionally or alternatively, a laser module (e.g., laser module 230) may be configured to emit two beams. A pointing module (e.g., pointing module 240) may be configured to direct one of the beams to a target (e.g., target 120) for ranging, and another of the beams to a ground station (e.g., ground station 110) for data communication. Thus, it may be advantageous to include two lasers in the laser module.

Figure 6:
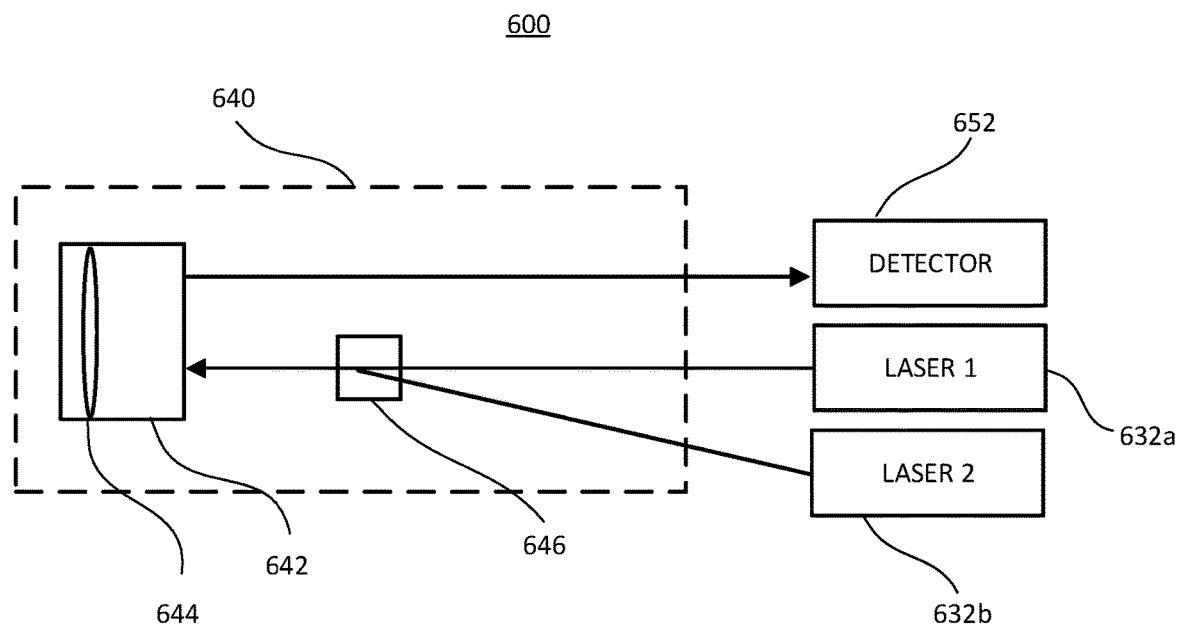
FIG. 6 illustrates an implementation of the system where the laser module includes two lasers sources.

FIG. 6 illustrates an implementation 600 of the system 201 in which the laser module 230 includes two lasers 632a,b. Each of the lasers 632a,b may be of any type described above or of another suitable type, and need not be of the same type. Furthermore, emission wavelengths of the two lasers 632a,b may be different. In some implementations, the same modulation circuit may be configured to modulate the two lasers 632a,b. In other implementations, each laser may have a respective modulation circuit. The lasers 632a,b may be configured to operate with different modulation schemes, for example, of the types described above.

The laser 632a may be configured as a communication laser to emit a communication beam. The laser 632b may be configured as a ranging laser to emit a ranging beam. It should be appreciated that in some implementations one or both of the lasers 632a,b may be configured for dual mode operation, adding redundancy in the system 201.

A pointing module 640 may include a guiding element 646 which may direct the respective beams emitted by each of the laser 632a,b to a pointing head 642 with from-end optics 644. In some implementations, the guiding element 646, which may be a dichroic mirror or another beam combiner statically disposed in the pointing module 640, may direct the two beams along a shared path. For example, the configuration 600 may be configured to operate either in the ranging or the communication mode at a given time, with the corresponding laser 632b or 632a turned on and emitting a beam. In other implementations, the guiding element 646 may be a dichroic mirror with a variable angle and/or may include other optical elements for directing one beam along one optical path and another along a different optical path. Thus, the guiding element 646 may introduce an angle difference between the two beams. In some implementations, the variable angle difference between the two beams may allow concurrent ranging and communication, as described above.

A detector 652 may be configured with a sufficiently broad spectral response and sufficiently fast time response to detect either a communication (or beacon) signal from a ground station (e.g., ground station 120) or a scattered portion of a ranging beam emitted by the ranging laser 632b. In other implementations, the detector module 250 may include multiple detectors. The pointing module 240 may include one or more optical elements to switch an optical receive path to a detector corresponding to a mode of operation or to spectrally separate the optical receive path for the different detectors.

Figure 7:
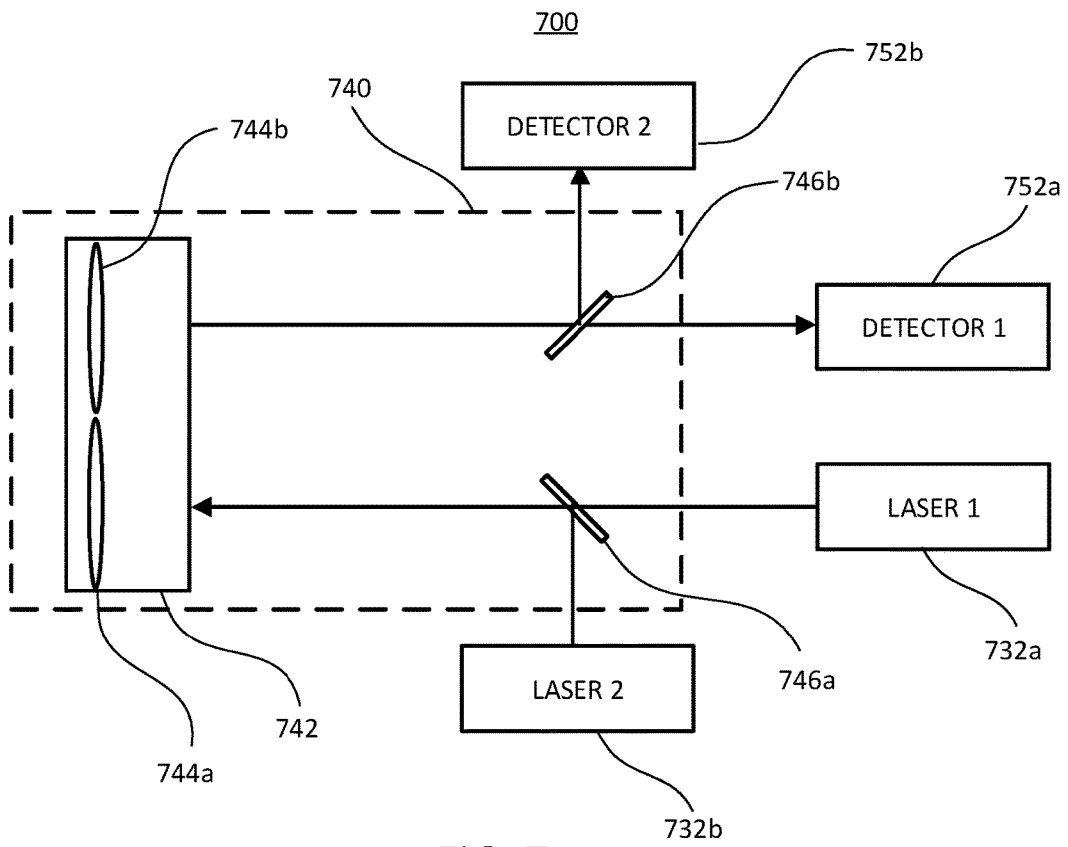
FIG. 7 illustrates a configuration of the system in which a pointing module includes a pointing head with separate front end optical assemblies for an optical transmit path and an optical receive path.

FIG. 7 illustrates a configuration 700 of the system 201 in which a pointing module 740 includes a pointing head 742 with separate front end optical assemblies 744a,b for an optical transmit path and an optical receive path. The two front end optical assemblies may be configured to have substantially the same look direction. An optical combiner 746a may combine beams emitted by two lasers 632a,b to emit through the transmit assembly 744a, while an optical splitter 746b may direct portions of the optical receive path to detectors 752a,b.

The lasers 732a,b may be configured to emit at different wavelengths. Likewise, the detectors 752a,b may be configured to receive optical signals at different wavelength. Consequently, the optical combiner 746a, in some implementations, have a spectrally selective property to transmit the wavelength of laser 732a, while reflecting the wavelength of laser 732b. Likewise, the optical splitter 746b may have a spectrally selective property to reflect the wavelength received by detector 752b, while transmitting the wavelength received by detector 752a. The spectrally selective splitter/combiners 746a/b may be configured for angular tuning to set an angle difference between optical transmit paths for lasers 732a,b and a corresponding difference in angle between look directions of the detectors 752a,b. Thus, the configuration 700 also may enable concurrent communication and ranging, as discussed, for example, with reference to FIG. 5.

Figure 8:
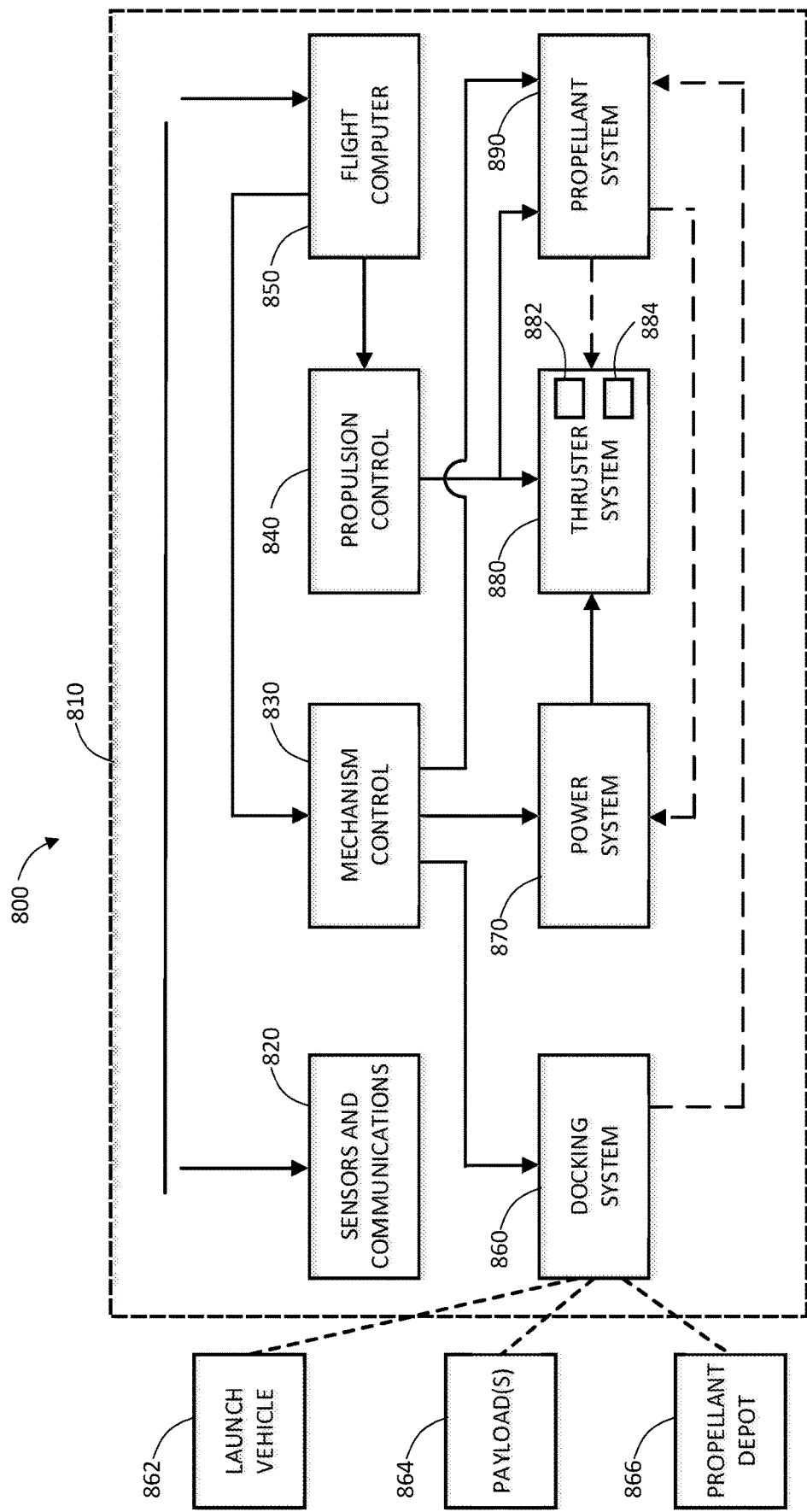
FIG. 8 is a block diagram of a spacecraft configured for transferring a payload between orbits in which an integrated communication and ranging system may operate.

FIG. 8 is a block diagram of a spacecraft 800 configured for transferring a payload between orbits in which an integrated communication and ranging system (e.g., system 101, 201) may operate. The spacecraft 800 includes a number of systems, subsystems, units, or components disposed in or at a housing 810. The subsystems of the spacecraft 800 may include sensors and communications components 820, mechanism control 830, propulsion control 840, a flight computer 850, a docking system 860 (for attaching to a launch vehicle 862, one or more payloads 864, a propellant depot 866, etc.), a power system 870, a thruster system 880 that includes a primary propulsion (main) thruster subsystem 882 and an attitude adjustment thruster subsystem 884, and a propellant system 890. Furthermore, any combination of subsystems, units, or components of the spacecraft 800 involved in determining, generating, and/or supporting spacecraft propulsion (e.g., the mechanism control 830, the propulsion control 840, the flight computer 850, the power system 870, the thruster system 880, and the propellant system 890) may be collectively referred to as a propulsion system of the spacecraft 800.

The sensors and communications components 820 may include a number of sensors and/or sensor systems for navigation (e.g., imaging sensors, magnetometers, inertial motion units (IMUs), Global Positioning System (GPS) receivers, etc.), temperature, pressure, strain, radiation, and other environmental sensors, as well as radio and/or optical communication devices to communicate, for example, with a ground station, and/or other spacecraft. The sensors and communications components 820 may be communicatively connected with the flight computer 850, for example, to provide the flight computer 850 with signals indicative of information about spacecraft position and/or commands received from a ground station. The sensor and communication components may include the disclosed integrated communication system.

The flight computer 850 may include one or more processors, a memory unit, computer readable media, to process signals received from the sensors and communications components 820 and determine appropriate actions according to instructions loaded into the memory unit (e.g., from the computer readable media). Generally, the flight computer 850 may be implemented using any suitable combination of processing hardware, that may include, for example, applications specific integrated circuits (ASICS) or field programmable gate arrays (FPGAs), and/or software components. The flight computer 850 may generate control messages based on the determined actions and communicate the control messages to the mechanism control 830 and/or the propulsion control 840. For example, upon receiving signals indicative of a position of the spacecraft 800, the flight computer 850 may generate a control message to activate one of the thruster subsystems 882, 884 in the thruster system 880 and send the message to the propulsion control 840. The flight computer 850 may also generate messages to activate and direct sensors and communications components 820. For example, the flight computer 850 may interact with the control module 260 as described above.

The docking system 860 may include a number of structures and mechanisms to attach the spacecraft 800 to a launch vehicle 862, one or more payloads 864, and/or a propellant refueling depot 866. The docking system 860 may be fluidicly connected to the propellant system 890 to enable refilling the propellant from the propellant depot 866. Additionally or alternatively, in some implementations at least a portion of the propellant may be disposed on the launch vehicle 862 and outside of the spacecraft 800 during launch.

The fluidic connection between the docking system 860 and the propellant system 890 may enable transferring the propellant from the launch vehicle 862 to the spacecraft 800 upon delivering and prior to deploying the spacecraft 800 in orbit.

The power system 870 may include components for collecting solar energy, generating electricity and/or heat, storing electricity and/or heat, and delivering electricity and/or heat to the thruster system 880. To collect solar energy, the power system 870 may include solar panels with photovoltaic cells, solar collectors or concentrators with mirrors and/or lenses, or a suitable combination of devices. In the case of using photovoltaic devices, the power system 870 may convert the solar energy into electricity and store it in energy storage devices (e.g., lithium ion batteries, fuel cells, etc.) for later delivery to the thruster system 880 and other spacecraft components. In some implementations, the power system 880 may deliver at least a portion of the generated electricity directly (i.e., bypassing storage) to the thruster system 880 and/or to other spacecraft components. When using a solar concentrator, the power system 870 may direct the concentrated (having increased irradiance) solar radiation to photovoltaic solar cells to convert to electricity. In other implementations, the power system 870 may direct the concentrated solar energy to a solar thermal receiver or simply, a thermal receiver, that may absorb the solar radiation to generate heat. The power system 870 may use the generated heat to power a thruster directly, as discussed in more detail below, and/or to generate electricity using, for example, a turbine or another suitable technique (e.g., a Stirling engine). The power system 870 then may use the electricity directly for generating thrust or storing electrical energy.

The thruster system 880 may include a number of thrusters and other components configured to generate propulsion or thrust for the spacecraft 800. Thrusters may generally include main thrusters in the primary propulsion subsystem 882 that are configured to substantially change speed of the spacecraft 800, or as attitude control thrusters in the attitude control thruster subsystem 884 that are configured to change direction or orientation of the spacecraft 800 without substantial changes in speed.

One or more thrusters in the primary propulsion subsystem 882 may be a microwave-electro-thermal (MET) thrusters. In a MET thruster cavity, an injected amount of propellant may absorb energy from a microwave source (that may include one or more oscillators) included in the thruster system 880 and, upon partial ionization, further heat up, expand, and exit the MET thruster cavity through a nozzle, generating thrust.

Another one or more thrusters in the primary propulsion subsystem 882 may be solar thermal thrusters. In one implementation, propellant in a thruster cavity acts as the solar thermal receiver and, upon absorbing concentrated solar energy, heats up, expands, and exits the nozzle generating thrust. In other implementations, the propellant may absorb heat before entering the cavity either as a part of the thermal target or in a heat exchange with the thermal target or another suitable thermal mass thermally connected to the thermal target. In some implementations, while the propellant may absorb heat before entering the thruster cavity, the primary propulsion thruster subsystem 882 may add more heat to the propellant within the cavity using an electrical heater or directing a portion of solar radiation energy to the cavity.

Thrusters in the attitude adjustment subsystem 884 may use propellant that absorbs heat before entering the cavities of the attitude adjustment thrusters in a heat exchange with the thermal target or another suitable thermal mass thermally connected to the thermal target. In some implementations, while the propellant may absorb heat before entering thruster cavities, the thrusters of the attitude adjustment thruster subsystem 884 may add more heat to the propellant within the cavity using corresponding electrical heaters.

The propellant system 890 may store the propellant for use in the thruster system 880. The propellant may include water, hydrogen peroxide, hydrazine, ammonia or another suitable substance. The propellant may be stored on the spacecraft in solid, liquid, and/or gas phase. To that end, the propellant system 890 may include one or more tanks, including, in some implementations, deployable tanks. To move the propellant within the spacecraft 800, and to deliver the propellant to one of the thrusters, the propellant system 890 may include one or more pumps, valves, and pipes. The propellant may also store heat and/or facilitate generating electricity from heat, and the propellant system 890 may be configured, accordingly, to supply propellant to the power system 870.

The mechanism control 830 may activate and control mechanisms in the docking system 860 (e.g., for attaching and detaching a payload or connecting with an external propellant source), the power system 870 (e.g., for deploying and aligning solar panels or solar concentrators), and/or the propellant system 890 (e.g., for changing configuration of one or more deployable propellant tanks). Furthermore, the mechanism control 830 may coordinate interaction between subsystems, for example, by deploying a tank in the propellant system 890 to receive propellant from an external propellant source connected to the docking system 860.

The propulsion control 840 may coordinate the interaction between the thruster system 880 and the propellant system 890, for example, by activating and controlling electrical components (e.g., a microwave source) of the thruster system 840 and the flow of propellant supplied to thrusters by the propellant system 890. Additionally or alternatively, the propulsion control 840 may direct the propellant through elements of the power system 870. For example, the propellant system 890 may direct the propellant to absorb the heat (e.g., at a heat exchanger) accumulated within the power system 870. Vaporized propellant may then drive a power plant (e.g., a turbine, a Stirling engine, etc.) of the power system 870 to generate electricity. Additionally or alternatively, the propellant system 890 may direct some of the propellant to charge a fuel cell within the power system 890. Still further, the attitude adjustment thruster subsystem 184 may directly use the heated propellant to generate thrust.

The subsystems of the spacecraft may be merged or subdivided in different implementations. For example, a single control unit may control mechanisms and propulsion. Alternatively, dedicated controllers may be used for different mechanisms (e.g., a pivot system for a solar concentrator), thrusters (e.g., a MET thruster), valves, etc. In the following discussion, a controller may refer to any portion or combination of the mechanism control 130 and/or propulsion control 140.

Figure 9:
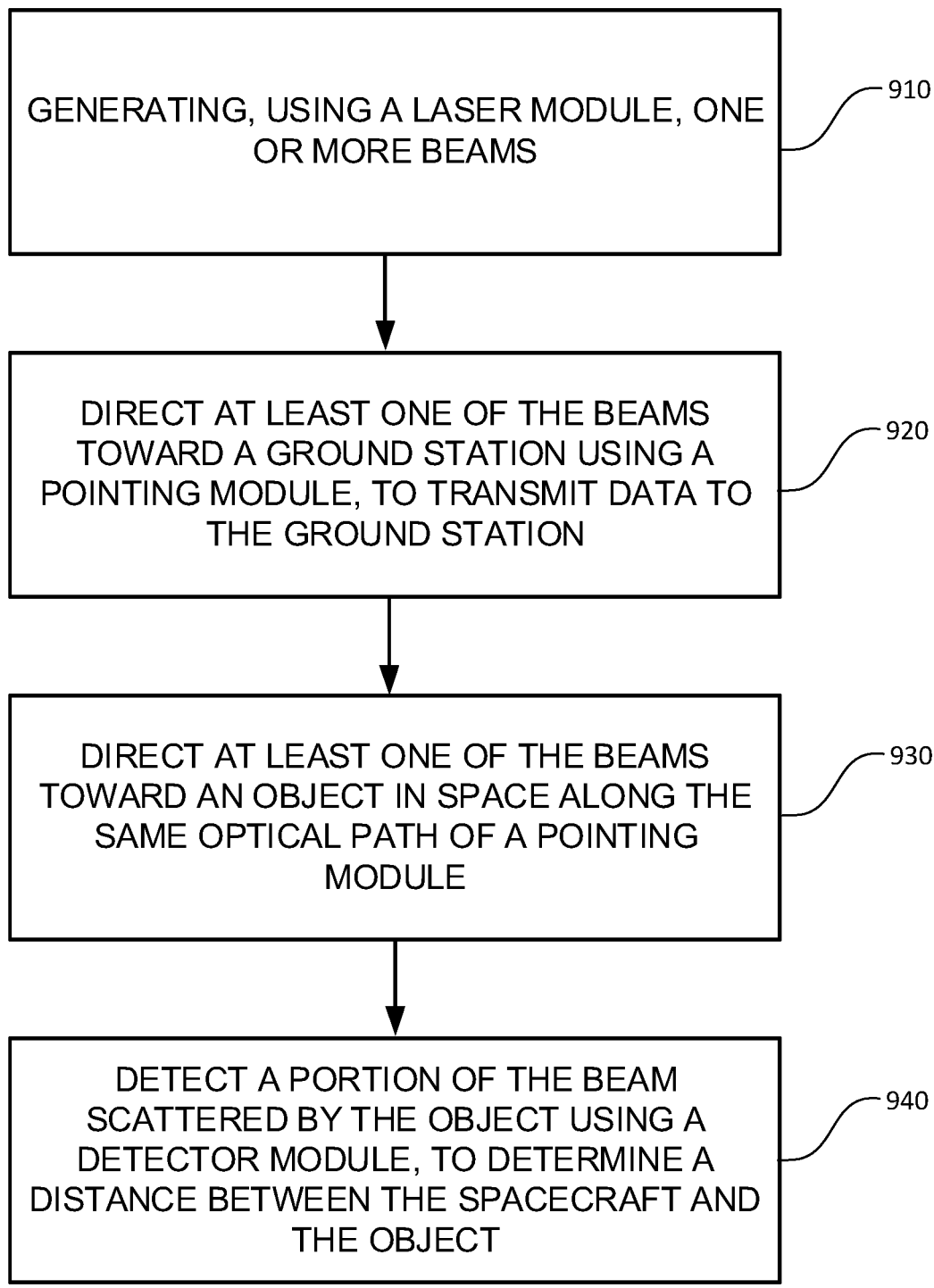
FIG. 9 illustrates an example method for communicating and ranging in a spacecraft using a laser-based system.

FIG. 9 illustrates an example method 900 for communicating and ranging in a spacecraft using a laser-based system (e.g., system 101 or system 201).

At block 910, the system may generate, using a laser module (e.g., laser module 230), at least one beam. The system may use one or more laser sources, as described above. When multiple beams are generated, the beams may have the same wavelength or different wavelengths. The beams may be coupled into optical fibers or other waveguides. In other implementations, the generated beams may be guided using free space optics.

The method 900 may include modulating one or more beams generated by the laser module. When generating more than one beam, the system may modulate some of the beams using one modulation technique, while modulating another beam (or other beams) using a second modulation technique. One of the modulation techniques may be more suitable for transmitting data, while another modulation technique may be more suitable for measuring distance. For example, the system may use amplitude modulation for transmitting data and frequency modulation (e.g., saw tooth chirp of laser wavelength or sinusoidal power modulation with variable frequency) for determining distance. When generating a single beam, the system may modulate the beam using one technique during one time period and using another technique during another time period. For example, the system may configure a beam modulated using two modulation techniques multiplexed in time, with a suitable time slot (e.g., 1, 10, 100, 1000, 10000, 100000 microseconds) for each modulation. The beam with time-multiplexed modulation may allow concurrent or nearly concurrent communication and ranging operations. In some implementations, the system may simultaneously apply two modulation techniques. For example, the system may tune laser wavelength for determining distance (a difference between local and returned wavelength signifying TOF) and, simultaneously, encode data in laser power (e.g., NRZ-OOK). In other implementations, the system may use one modulation in one operational mode (e.g., communication), while using another modulation in a second operational mode (e.g., ranging), the two modes separate in time (e.g., by multiple second, minutes, etc.). In some implementations, the system may modulate at least one beam using pulse position modulation (PPM). In some implementations, the system may use PPM for both, data communication and ranging. For example, a sequence of pulses that encode data may also contribute to measuring TOF (e.g., by auto-correlating a detected sequence with a transmitted sequence). In other implementations, PPM may be used for data transmission and/or ranging in a time-multiplexed manner or during separate operating modes, as described above.

At block 920, the system may direct at least one of the generated beams toward a ground station using a pointing module (e.g., pointing module 240) to transmit data to the ground station. The system may direct the full beam or a portion of the beam, as described below. The beam may carry data encoded in the modulation.

At block 930, the system may direct at least one of the beams toward an object in space using the pointing module. The beam directed toward the ground station and the beam directed toward the object in space may share a portion of an optical path. That is, the pointing module may direct both beams along a shared path or path section, as schematically illustrated in FIGS. 3, 4, 6, and 7. The beam directed toward the object may be modulated to encode timing information. In this manner, the system may determine TOF and distance to the object after detecting a scattered portion of the beam.

The system may directed a beam toward the ground station and toward the object concurrently. In one implementation, the system may generate one beam using the laser module and split the beam using the pointing module. Thus, the beam directed to the ground station may be one portion of the split beam, while the beam directed to the object may be another portion of the split beam. To split the beam, the pointing module may include a splitter. In some implementations, the pointing module may direct one portion of the split beam through one pointing head and another portion through another pointing head, as described above.

To direct a beam toward an object in space, the system may obtain a general location of the object. For example, the system may use one or more imaging sensors, such as a CCD or a CMOS sensors. The imaging sensors may operate in visible light or infrared light. In some implementations, an array of imaging sensors may be disposed at the spacecraft and be in the communication with the system to share the general direction of a detected object.

Additionally or alternatively, the system may use a database configured to store approximate positions of objects in space at respective times. The system may select and scan regions of space using cameras and/or a laser beam based on the data in the database and spacecraft sensors to detect the object with greater precision.

At step 940, the system may detect a portion of the beam scattered by the object using a detector module (e.g., detector module 250). The system may use the detected portion of the beam to determine the distance between the system (or, by extension, the spacecraft) and the object, as described above.

What is claimed is:

1. An integrated communication and ranging system for use on a spacecraft, the system comprising:
   a laser module configured to emit a first beam and a second beam;
   a pointing module configured to direct the first beam toward a ground station and direct the second beam toward an object in space;
   a detector module configured to detect a scattered portion of the second beam; and
   a control module configured to operate the pointing module to (i) transmit data to the ground station using the first beam and an amplitude modulation technique and (ii) determine, using the detector module and a frequency modulation technique, a distance between the spacecraft and the object using the one second beam,
   wherein the control module modulates the first beam concurrently with the second beam using the amplitude modulation technique and the frequency modulation technique.

2. The integrated communication and ranging system of claim 1, further comprising:
   an image sensor configured to operate in a visible light spectrum;
   wherein the control module is further configured to determine a general orientation of the object relative to the spacecraft using the image sensor, prior to determining the distance between the object and the spacecraft using the second beam.

3. The integrated communication and ranging system of claim 2, wherein the image sensor includes an array of complementary metal-oxide-semiconductor (CMOS) cameras.

4. The integrated communication and ranging system of claim 1, further comprising:
   a database configured to store approximate positions of objects in space at respective times;
   wherein the control module is further configured to determine a general orientation of the object relative to the spacecraft using the database.

5. A method for communicating and ranging in a spacecraft, the method comprising:
   generating, using a laser module, a beam;

directing the beam toward a ground station using a shared optical path of a pointing module, to transmit data to the ground station, including modulating the beam with a first modulation technique during a first time period having a duration less that one millisecond;

directing the one beam toward an object in space using the shared optical path of a pointing module; and detecting a portion of the one beam scattered by the object using a detector module, to determine a distance between the spacecraft and the object, including modulating the beam with a second modulation technique during a second time period having a duration less that one millisecond and immediately following the first time period.

6. The method for communicating and ranging in spacecraft of claim 5, wherein:

directing, using a splitter, a first portion of the beam toward the ground station and direct a second portion of the beam toward the object.

7. The method for communicating and ranging in spacecraft of claim 5, wherein:

the first modulation technique includes amplitude modulation; and the second modulation technique includes frequency modulation.

8. The method for communicating and ranging in spacecraft of claim 5, further comprising:

modulating the one beam using pulse position modulation.

9. An integrated communication and ranging system for use on a spacecraft, the system comprising:

a laser module configured to emit at least one beam;

an image sensor configured to operate in a visible light spectrum;

a pointing module configured to direct the at least one beam toward a ground station and toward an object in space;

a detector module configured to detect a scattered portion of the at least one beam; and a control module configured to operate the pointing module to (i) transmit data to the ground station using the at least one beam, (ii) determine, using the detector module, a distance between the spacecraft and the object using the at least one beam, and (iii) determine a general orientation of the object relative to the spacecraft using the image sensor, prior to determining the distance between the object and the spacecraft using the at least one beam.

10. The integrated communication and ranging system of claim 9, wherein the control module is configured to:

transmit the data to the ground station in a first operational mode, and determine the distance between the spacecraft and the object in a second operational mode that does not overlap in time with the first operational mode.

11. The integrated communication and ranging system of claim 10, wherein:

the pointing module includes a mechanism configured to orient an optical path toward the ground station in the first operational mode and orient the optical path toward the object in the second operational mode.

12. The integrated communication and ranging system of claim 9, wherein the control module is configured to:

transmit the data to the ground station and determine the distance concurrently.

13. A method for communicating and ranging in a spacecraft, the method comprising:

generating, using a laser module, a beam;

directing the at least one beam toward a ground station using a shared optical path of a pointing module, to transmit data to the ground station, including modulating the beam with a first modulation technique;

directing the at least one beam toward an object in space using the shared optical path of a pointing module; and detecting a portion of the at least one beam scattered by the object using a detector module, to determine a distance between the spacecraft and the object, including modulating the beam with a second modulation technique, simultaneously with modulating the beam with the first modulation technique.

14. The method for communicating and ranging in a spacecraft of claim 13, further comprising:

directing, using a splitter, a first portion of the beam toward the ground station and direct a second portion of the single beam toward the object.

15. The method for communicating and ranging in a spacecraft of claim 13, wherein:

the first modulation technique includes amplitude modulation, and the second modulation technique includes frequency modulation.

* * * * *

UNITED STATES PATENT AND TRADEMARK OFFICE
CERTIFICATE OF CORRECTION

| | |
|---|---|
| PATENT NO. | : 11,381,310 B2 |
| APPLICATION NO. | : 16/951191 |
| DATED | : July 5, 2022 |
| INVENTOR(S) | : Robert Erik Schwarz |

It is certified that error appears in the above-identified patent and that said Letters Patent is hereby corrected as shown below:

In the Claims

Column 22, Line 39, Claim 1, "one second" should be -- second --.

Signed and Sealed this
Twenty-seventh Day of December, 2022

*Katherine Kelly Vidal*

Katherine Kelly Vidal
*Director of the United States Patent and Trademark Office*